Patented Mar. 2, 1954

2,671,006

UNITED STATES PATENT OFFICE 2,671,006

PROCESS OF TREATING WOOL TO RENDER IT NONFELTING

John H. McLauchlan, Kilmarnock, Scotland, assignor to Kroy Unshrinkable Wools, Limited, Toronto, Ontario, Canada, a corporation of Ontario, Canada No Drawing. Application April 19, 1948, Serial No. 21,851

8 Claims. (Cl. 8—128)

My invention relates to the shrinkproofing of wool, and more particularly it relates to an improved method for the controlled chlorination of wool by which the desired shrinkproofing of the wool may be obtained in an efficient and economical process without loss of the desirable characteristics of the wool.

For many years, workers in the wool industry have attempted to find a suitable method of shrinkproofing wool, and early in the development of the art the treatment of wool with chlorine, either as the free gas or in solution as a hypochlorite or hypochlorous acid, was suggested. All of the early methods involving chlorine had the disadvantage that wool so treated became brittle, lost its pleasant feel and had its strength and toughness materially decreased. In addition, the processes were difficult to control and often resulted in spotty and uneven chlorination.

Attempts have also been made to use reagents other than chlorine or hypochlorites. Bromine, sulphuryl and nitrosyl chloride have been used, as well as aqueous and alcoholic solutions of caustic soda and potash. Various resins have been suggested which when applied to wool would coat the fibres with a water impervious layer, and thus reduce the swelling effect when the wool is wet and probably reduce the differential friction effect. All of these methods have been unsatisfactory for one reason or another. In general, either the product was unduly harsh in feel, the shrinkproofing was not permanent, or the reagents to be used were too costly.

In later years, workers have again tried various methods of using chlorine, since it is the cheapest and potentially the most effective agent obtainable. However, these attempts have not usually progressed beyond the laboratory stage and have usually failed to be commercially feasible. Moreover, they have not been adaptable to an efficient or continuous operation and/or have been dangerous to operating personnel because of the large quantities of poisonous gas liberated.

Among the prior proposals was the use of a quick treatment with a relatively strong solution of reagent, as for example treatment with a solution containing 0.5 to 1.5% available chlorine at a pH of 6 to 7, and a temperature of about 20° C. for about 20 seconds. The treatment was to be repeated three or four times in an effort to attain the necessary and desired effect. Another proposal involved the use of a very dilute solution of the reagent and the treatment for an excessively long time, for example with a solution containing 0.00045 to 0.022% available chlorine at a pH of below 2 and a temperature of about 50° F. for a time of about 40 minutes. Neither of these two processes has gone into commercial use so far as is known. The first offers considerable danger to the operating personnel and produces goods which are unevenly chlorinated. The long contact required by the second treatment renders it economically undesirable for that and other reasons.

In contrast to the prior processes suggested for the treatment of wool, the present process involves a controlled chlorination in which there is used a hypochlorite ion containing solution containing from about 0.035% to about 0.09% available chlorine at a pH of from about 2.2 to about 3.5 and a temperature of between about 4° C. and about 24° C. and a contact time for at least about 30 seconds. Preferably the time of immersion will not exceed about 70 seconds and advantageously is about 45 seconds. The wool is advantageously treated with the aforesaid solution under the stated conditions by immersion of the wool in the hypochlorite ion-containing solution. After the wool has been maintained in contact with the solution for the desired period of time, the solution is removed from the wool, for example by rinsing, or is subjected to an anti-chlor. When needed the wool may be subjected to the action of a wetting agent. The wetting agent may be incorporated in the hypochlorite solution or the wool may have been previously wet out by immersion in a preliminary bath containing only a wetting agent.

While the process of the present invention to render the wool shrinkproof may be conducted in one tank, either by continuous immersion or by repeated immersions therein for the stated time, in the preferred embodiment of the invention it is advantageous to pass the wool through three separate baths of substantially identical composition, for example by allowing the wool to remain in each bath for a period of about 15 seconds. The first bath may have added to it a wetting agent; or a preliminary wetting may take place in an extra bath containing only a wetting agent of the kind mentioned. Upon emerging from the last hypochlorite bath, the solution is removed from the wool, preferably by passing the treated wool through squeeze rollers and immediately through a fourth bath of water.

While in the preferred embodiment of the invention wool tops are treated, it is to be understood that the process is applicable for the treatment of wool in other forms, including wool fabricated into woven or knitted goods or yarn.

Referring to the hypochlorite ion-containing solution, it may be provided by any water-soluble inorganic compound furnishing hypochlorite ions in solution. Such compounds are well known, examples of which are the alkali metal and alkaline earth metal hypochlorites, such as sodium hypochlorite, potassium hypochlorite, calcium hypochlorite and the like, and hypochlorous acid. Sodium hypochlorite is preferred due to its availability, relative stability and the fact that no undesirable deposit on the wool will be obtained even if carbonate and sulphate ions are present in the water.

The amount of hypochlorite ion-furnishing compound employed will, of course, be sufficient to provide the available chlorine within the limits hereinabove set forth. It is preferred to operate at about .05% available chlorine. Amounts of available chlorine materially below 0.035% require unnecessarily long times of contact with its attendant disadvantages or gives insufficient chlorination while amounts of available chlorine in excess of 0.09 results in over chlorination and attendant deleterious effects on the wool.

As stated, the solution employed in the present invention has a pH maintained from about 2.2 to about 3.5. These acid conditions may be provided by any acid or acidic material but generally a strong inorganic acid such as hydrochloric acid, sulphuric acid and the like is employed, and of these, hydrochloric acid is preferred.

The wetting agent should be stable in the presence of the chemicals involved and at the concentrations employed in my process, particularly in the presence of chlorine and an acid. Suitable agents are sold under the trade names and known in the trade as "Nacconol" HG, "Cerfak" N 100, "Calsolene Oil," HS, the latter being a new highly sulfonated oil. The amount used will vary depending on the amount of oil on the wool. "Nacconol" is a preferred agent in amount between 0.05% to 1.0%.

By the present invention a process has been provided by which commercially satisfactory results can be achieved at low cost. Wool treated by the present invention is uniform in its characteristics and compares in pliability, feel and strength with the original wool treated. The wool so treated will be shrink-resistant or shrinkproof; that is to say, when the treated articles or articles made from treated wool tops are washed in the usual manner, they will not felt to any significant extent. For example, in the case of knitted socks, prepared from treated wool tops, the socks upon washing will not shrink below their knitted size. The short treatment time in addition provides an efficient and economical process.

The following are examples of the preferred methods of carrying out my novel process and will serve to illustrate my invention:

Example 1

A solution is prepared as follows: To 220 gallons of water are added 7 pints of a solution of sodium hypochlorite having a specific gravity of 1.176 and an available chlorine content of between 11.3 and 13.7% by weight. To the solution are then added 4 pints of hydrochloric acid (15.75% HCl by weight), the whole procedure being carried out at a preferred temperature of between about 6° C. and about 8° C. Three such baths as described above are prepared. If the wool is well scoured, a wetting agent may not be needed, but when needed "Nacconol" HG at 0.05% to 1.0% has been used satisfactorily the percentage depending on the amount of oil in the wool being treated. The wetting agent is placed in the first of the three baths. Wool tops are passed through the three successively, spending about 15 seconds in each bath and about 2 seconds in the air, travelling from one bath to the next. A pH of between 2.2 and 3.5 and an available chlorine content of about .05% are maintained by adding hydrochloric acid and sodium hypochlorite solutions when required. After leaving the last tank of hypochlorite solution, the tops are passed to a washing tank containing water in which they are washed for about 15 seconds.

Alternatively, when it is necessary to take added precautions to ensure a thorough wetting, a separate bath having wetting agent in the upper limits of the range stated, is prepared and the tops are passed through it immediately before being subjected to treatment in the hypochlorite bath.

Example 2

A solution is prepared as follows: To 220 gallons of water are added 7 pints of a solution of sodium hypochlorite having a specific gravity of 1.285 and an available chlorine content of between 14.0 and 15.0% by weight. To the solution are then added 4 pints of hydrochloric acid (15.75% HCl by weight), the whole procedure being carried out at a preferred temperature of between 6° C. and about 8° C. Three such baths as described above are prepared. When a wetting agent is needed, "Calsolene Oil" HS at about 0.16% has been used satisfactorily, the percentage depending on the amount of oil in the wool being treated. The wetting agent is placed in the first of the three baths. As in the first example, wool tops are passed through the three successively, spending about 15 seconds in each bath and about 2 seconds in the air, traveling from one bath to the next. A pH of between 2.2 and 3.5 and an available chlorine content of about .07% are maintained by adding hydrochloric acid and sodium hypochlorite solutions when required. After leaving the last tank of hypochlorite solution, the tops are passed to a washing tank containing water in which they are washed for about 15 seconds as in the first example.

The wool tops may be conveyed by conventional apparatus such as is used in scouring. Such apparatus has cylindrical rollers over which pass continuous parallel tapes upon which the tops are laid in sinusoidal pattern. While under the surface of the bath, the tops are passed through squeezing rollers to insure complete penetration of the solution into the wool. As the tops leave one bath, they pass between squeezing rollers before entering the next bath and before entering the washing tank.

My invention is described as the Lambda Process and is thus distinguished from others in practice.

Having now fully described my invention, what I claim is:

1. A process of shrinkproofing wool which comprises bringing wool into contact with an aqueous hypochlorite ion containing solution having an available chlorine content of from about 0.035% to about 0.09%, a pH of from about 2.2 to about 3.5 and a temperature of from about 4° C. to about 24° C., maintaining the solution within said limits continuously by adding aqueous hypochlorite and acid to compensate for losses due to reaction with the wool while the wool is in contact with the solution, and removing the solution from the wool after a treatment of from about 30 seconds to about 70 seconds.

2. The process of claim 1 wherein the wool is first wet out with a wetting agent stable in the presence of chlorine and acid.

3. The process of claim 2 wherein the hypochlorite ions are furnished by sodium hypochlorite; wherein the temperature of the solution is between about 6° C. and about 8° C. and wherein the time of contact between the wool and said solution does not exceed about 70 seconds.

4. The process of claim 1 wherein the solution contains a wetting agent stable in the presence of chlorine and acid.

5. The process of claim 4 wherein the hypochlorite ions are furnished by sodium hypochlorite, wherein the temperature of the solution is between about 6° C. and 8° C., and wherein the time of contact between the wool and said solution does not exceed 70 seconds.

6. A process of shrinkproofing wool which comprises subjecting wet-out wool to a plurality of treatments with an aqueous hypochlorite ion containing solution, having an available chlorine content of from about 0.035% to about 0.09%, a pH of from about 2.2 to about 3.5 and a temperature of from about 4° C. to about 24° C., maintaining said conditions for the entire period of treatment by adding aqueous hypochlorite and acid to said solution to compensate for losses due to reaction with the wool, and removing the solution from the wool after a treating time of from about 30 seconds to about 70 seconds.

7. The process of claim 6 wherein the hypochlorite ions are furnished by sodium hypochlorite; wherein each treatment is in a separate solution; wherein the temperature of said solution is from about 6° C. to about 8° C. and wherein the pH condition is provided by hydrochloric acid and wherein the total time of contact between the wool and said solution is about 45 seconds.

8. A process of shrinkproofing wool which comprises bringing wool into contact with an aqueous hypochlorite ion containing solution having an available chlorine content of about .035% to about .07% and a pH from about 2.5 to about 3, maintaining the solution within said limits by adding aqueous hypochlorite and acid to compensate for losses due to reaction with the wool while the wool is in contact with the solution, and removing the solution from the wool after treatment of from about 30 seconds to about 70 seconds.

J. H. McLAUCHLAN.

References Cited in the file of this patent

UNITED STATES PATENTS

| Number | Name | Date |
| --- | --- | --- |
| 2,326,021 | Ericsson | Aug. 3, 1943 |
| 2,466,695 | Frishman | Apr. 12, 1949 |

FOREIGN PATENTS

| Number | Country | Date |
| --- | --- | --- |
| 114,116 | Australia | Oct. 23, 1941 |
| 114,889 | Australia | Mar. 16, 1942 |
| 474,557 | Germany | Apr. 4, 1929 |
| 551,310 | Great Britain | Feb. 17, 1943 |

OTHER REFERENCES

Edwards: "Unshrinkable Finish," J. Soc. Chem. Ind., July 15, 1932, pages 234T–237T.

Justin-Mueller: "Contribution—Chlorage de la Laine," Rev. gen. mat. color., vol. 41, 1937, pages 78–86, pages 82–86 especially pertinent.